United States Patent [19]
Jones

[11] 3,934,101
[45] Jan. 20, 1976

[54] MULTIPLE CIRCUIT MULTIPLE SWITCH HAVING A PAIR OF MANUALLY MOVABLE ACTUATING ELEMENTS

[75] Inventor: Wesley C. Jones, Waukegan, Ill.

[73] Assignee: Cherry Electrical Products Corporation, Waukegan, Ill.

[22] Filed: Jan. 20, 1975

[21] Appl. No.: 542,506

[52] U.S. Cl............. 200/5 B; 200/16 A; 200/16 D; 200/61.27; 200/61.54
[51] Int. Cl.² H01H 9/26; H01H 13/70; H01H 15/08
[58] Field of Search........ 200/4, 5 R, 5 A, 5 B, 5 C, 200/16 R, 16 B, 16 C, 16 D, 17 R, 18, 61.27, 61.54, 61.57, 61.86, 61.85, 153 D, 157, 159 R, 159 A, 239, 243, 329, 330, 340

[56] References Cited
UNITED STATES PATENTS

| | | | |
|---|---|---|---|
| 2,485,340 | 10/1949 | Warmey | 200/159 R X |
| 3,290,454 | 12/1966 | Hubert | 200/5 R |
| 3,511,943 | 5/1970 | Kibler | 200/61.54 X |
| 3,603,748 | 9/1971 | Cryer | 200/5 B |
| 3,761,662 | 9/1973 | Charles | 200/61.54 X |
| 3,784,765 | 1/1974 | Daly | 200/16 D X |

Primary Examiner—James R. Scott
Attorney, Agent, or Firm—Edward C. Threedy

[57] ABSTRACT

An electrical switch having a push button type actuator and a plurality of circuit-making type contact members, some of which are adapted to be momentarily moved by the actuator into contact with stationary electrical terminal members while other contact members are simultaneously initially slidably moved by the actuator into contact with yet another set of electrical terminal members and then adapted for independent slidable movement through a multitude of positions into contact with still other electrical terminals.

8 Claims, 6 Drawing Figures

Fig. 1.

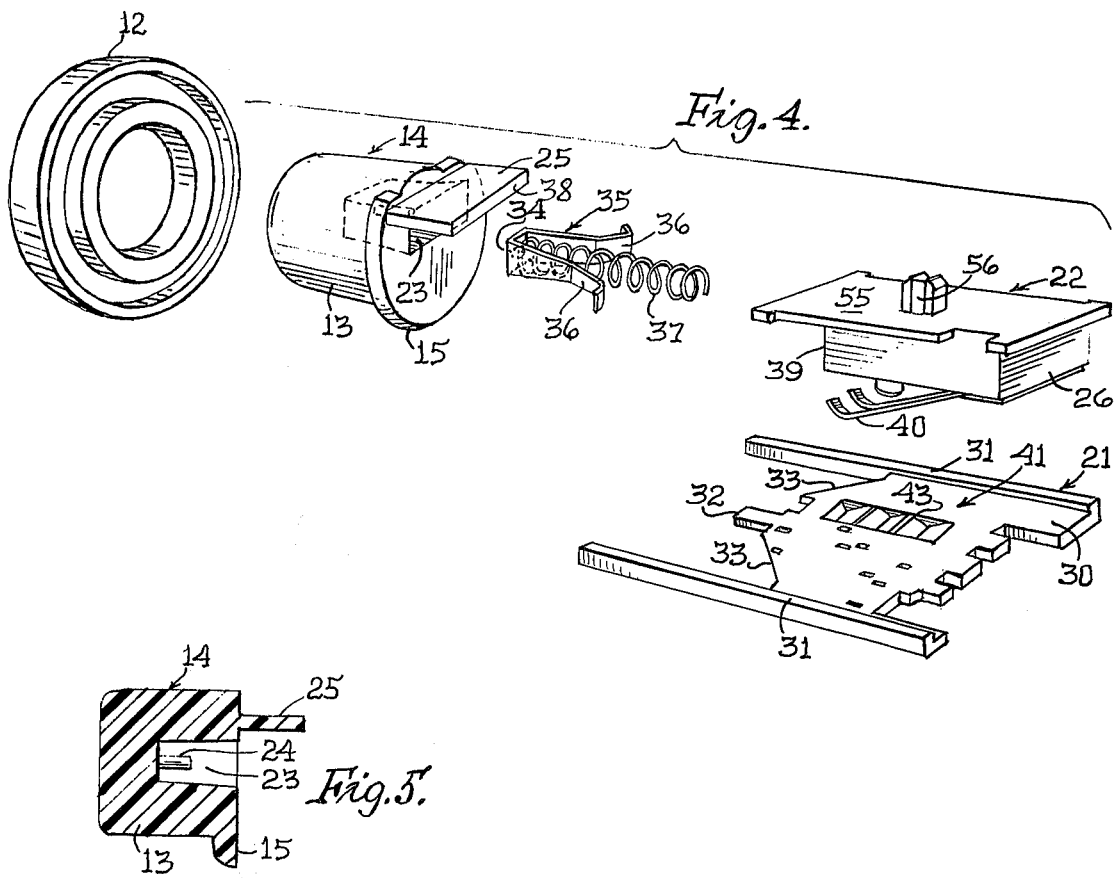
Fig. 4.
Fig. 5.
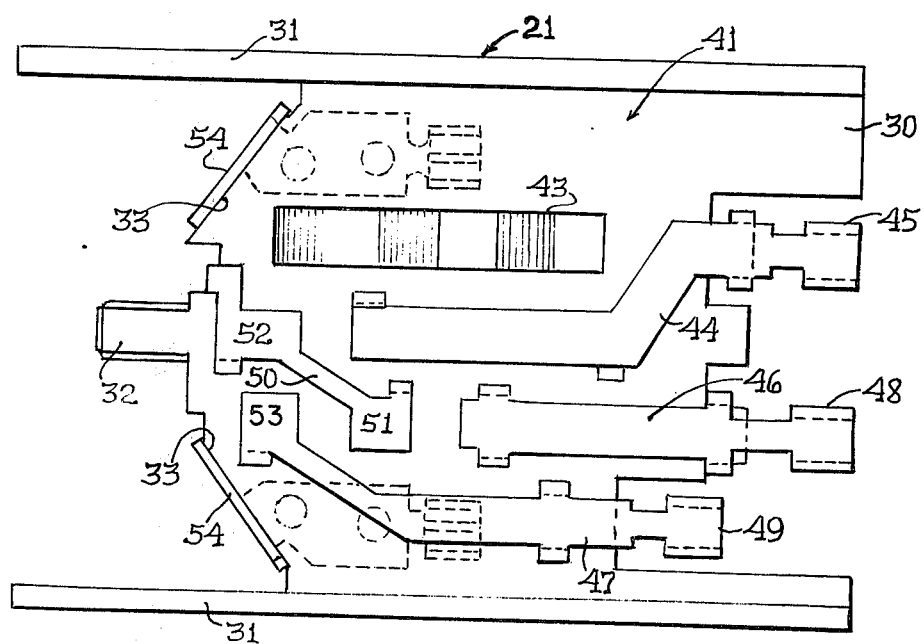
Fig. 6.

MULTIPLE CIRCUIT MULTIPLE SWITCH HAVING A PAIR OF MANUALLY MOVABLE ACTUATING ELEMENTS

SUMMARY OF THE INVENTION

A slide switch having a push button type actuator, the movement of which simultaneously positions different sets of movable contacts into engagement with designated electrical terminal members so as to complete predetermined circuits therethrough; one set of contacts is by initial movement of the push button actuator momentarily placed into contact with a set of electrical terminal members, while the other set of contacts is by such initial movement of the push button actuator slidably positioned into continuing contact with a set of other electrical terminals.

After initial movement by the push button actuator, the second set of contacts is adapted to be independently moved into contact with other selected electrical terminals for establishing predetermined electrical circuits therethrough.

By an indexing element the second set of contacts is maintained in their selected position until manual return to their original positions, where they may be once again initially moved by the push button actuator.

The present switch is designed to be incorporated in a relatively confined area, such as a turn signal lever mounted on the steering column of an automobile. By initial actuation a momentary circuit is completed to a window-washing fluid pump and a continuing circuit to the mechanism for operating the windshield wipers at a slow speed. By further manual independent movement the second set of contacts may be advanced to engage other electrical terminals to increase the speed of the windshield wiper mechanism.

The invention will be best understood by reference to the accompanying drawings showing the preferred embodiment of the invention, and in which:

FIG. 4 is an exploded view of certain components of the slide switch;

FIG. 5 is a detailed sectional view of the push button actuator as employed in the slide switch; and FIG. 6 is a top plan view of the circuit board of the slide switch.

GENERAL DESCRIPTION

Figure 1:
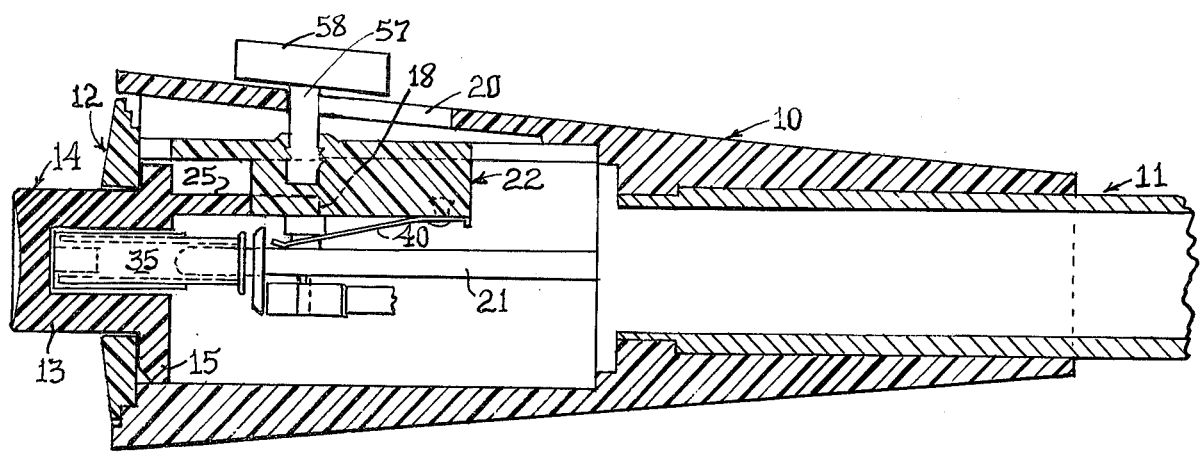
FIG. 1 is a fragmentary detailed sectional view of the switch housing and components in their original or inoperative position.

The shown embodiment of the present invention illustrates a dielectric tubular housing 10 attached by a press-fit to the end of a hollow shaft 11, which may constitute a turn signal lever normally carried by the steering column of an automobile.

The housing 10 provides an open end adapted to be closed by a disc 12 having a center aperture through which slidably projects the head 13 of a push button actuator 14. The push button actuator 14 includes a circular collar 15 normally disposed behind the disc 12 so as to be prevented from separation from the housing through the open end, while permitted to be moved inwardly through the housing 10 in the manner and for the purpose hereinafter explained.

The interior of the housing 10 provides a cavity 16, the side wall of which has formed therein a plurality of sets of aligned grooves 17, 18 and 19, as well as a top opening 20.

Each set of aligned grooves slidably receives an opening of the switch structure. Thus, the grooves 17 receive the circuit plate 21, while the grooves 18 receive a portion of the push button actuator 14, and the grooves 19 receive a slidable switch actuator 22.

In FIG. 4 the components of the switch are shown in their exploded relation and, as shown therein, the inner face of the push button 14 provides a recess 23 in which is contained a stud 24 (FIG. 5). A ledge 25 projects longitudinally of the inner face of the push button actuator 14, the longitudinal side edges of the ledge 25 being adapted to be slidably projected into the grooves 18 provided by the housing 10.

The slide switch actuator 22 consists of a substantially rectangularly shaped block 26 having a top wall 27 that provides overlapping side and end edges 28 and 29, respectively, with the side edges 28 slidably received in the grooves 19 provided by the housing 10.

Figure 3:
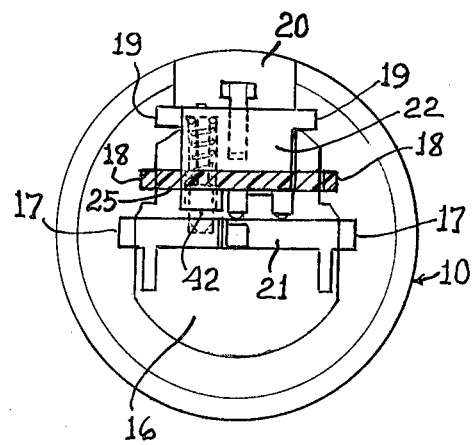
FIG. 3 is a detailed sectional end view showing the interior of the switch housing with certain components positioned therein.

The circuit plate 21 consists of a relatively flat body portion 30 which provides rails 31 which, in turn, are adapted to be received in the grooves 17 provided by the housing 10. When the components are slidably mounted within the housing 10, the members will assume the relation, one to the other, as shown in FIGS. 1 and 3.

The front edge of the flat body portion 30 of the circuit plate 21 provides a longitudinally extending post 32 which has formed to either side thereof diverging rearwardly directed angular edge portions 33 which extend rearwardly until they form a junction with the rails 31.

As shown in FIG. 1, when the circuit plate 21 is mounted in the grooves 17 and the push button actuator 14 has its ledge 25 projected into the grooves 18, with its circular head 13 projecting out of the center aperture of the disc 12, the recess 23 formed in the push button actuator 14 and the stud 24 contained therein will be in longitudinal alignment with the post 32 of the circuit plate 21.

Figure 2:
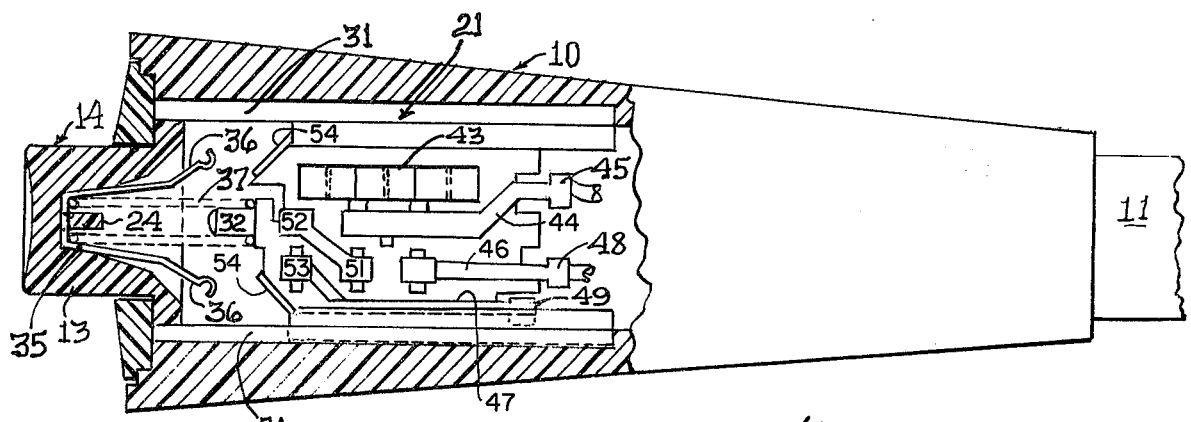
FIG. 2 is a detailed sectional view showing in full the electrical circuit terminal members and certain switch contacts of the slide switch.

Adapted to be positioned within the recess 23 provided by the push button 14 and upon the stud 24, is the flattened apex 34 of a V-shaped spring contact 35. The arms 36 of the spring contact 35 are adapted to extend outwardly of the recess 23 beneath the ledge 25 of the push button 24 into the direction of the tapered front edges 33 of the circuit plate 21, as clearly shown in FIG. 2. Positioned within the arms 36 of the contact 35 and having one end coiled about the stud 24 and the other end coiled about the post 22 of the circuit plate 21, is a coil spring 37. The coil spring 37 normally urges the circular collar 15 of the push button 14 into facial abutment with the inner wall of the disc 12, maintaining the push button 14 in the position shown in FIGS. 1 and 2.

The free forward edge 38 of the ledge 25 of the push button 14, when it is mounted in grooves 18 provided by the housing 10, will be in facial contact with the front wall 39 of the rectangular block 26 of the slide actuator 22, the slide actuator 22 carrying on its bottom wall a pair of switch fingers 40 adapted to have sliding contact with electrical conductors carried on the upper face 41 of the flat body portion 30 of the circuit plate 21. The block 26 of the slide switch actuator 22 provides a recess, opening from the bottom wall thereof and housing a spring-urged detent 42 which is adapted to have yieldable contact with a set of tapered walled recesses 43 formed in the top wall surface 41 of the circuit plate 21.

The top wall 41 of the circuit plate 21 carries a first conductor path 44 which terminates into a wire connector 45, and a second and third electrical conductor path 46 and 47 which also terminate into a wire-receiving socket 48 and 49, as well as a fourth electrical conductor path 50 which includes a head section 51 disposed in alignment with the second conductor path 46 and a second conductor head 52 which is disposed in longitudinal alignment with the first conductor path 44 and is laterally offset with respect to a conductor head 53 of the third conductor path 47, all as clearly shown in FIG. 6.

Extending perpendicularly of each of the tapered front edges 33 of the flat body 30 of the circuit plate 21 are disposed fixed terminal plates 54 which have conductive paths extending beneath the flat body portion 30 of the plate 21, and which are shown in dotted lines in FIG. 6.

The top wall 55 of the slide switch actuator 22 provides a rectangular housing 56 which receives a leg 57 of an actuator head 58. The leg 57 is adapted to project out of the opening 20 formed in the housing 10, with the actuator head 58 exposed externally of the housing 10, as shown in FIG. 1.

In operation, when the switch is desired to be operated the operator will manually depress the head 13 of the push button actuator 14 in the direction of the disc 12. By this movement the ends of the contact arms 36 of the contact 35 will, against the compression of the spring 37, be moved into momentary contact with the terminal plates 54 carried by the front edges 33 of the circuit plate 21. This momentary contact will complete a circuit therethrough to energize a selected electrical operation. In the preferred embodiment, this would momentarily energize a window washer fluid-dispensing pump, which would cause a spray of fluid to be dispensed upon the windshield of an automobile. Simultaneously the ledge 25 of the push button 14 will move through its grooves 18 and cause the switch actuator 22 to be moved in a direction from left to right, as shown in FIG. 1, causing the switch fingers 40 thereof to move off the conductor heads 52 and 53 of the respective conductor paths 50 and 47 so that they will be in contact with the conductor head 51 of the conductor path 50 and the elongated conductive path 44.

In such a position, a complete electrical circuit is made therethrough, which, in the preferred mode, will result in the windshield wiper mechanism being energized at a slow speed.

The spring 37 will return the push button 14 to its original position as soon as the external pressure is relieved from the head 13 thereof, thus breaking the circuit to the windshield washer. By reason of the indexing mechanism 42, the circuit through the slide switch actuator 22 and its spring fingers 40 and the conductive paths on the circuit plate 21 will remain completed until manual return of the slide switch actuator 22 through external manipulation of the actuator head 58.

If it is desirable to operate the windshield wipers without employing the windshield washer, the operator through the movement of the actuator head 58 through the opening 20, can manually move the slide switch actuator 22 into its first position, wherein it is operated at a slow speed in the manner hereinbefore described, or, by continuous movement, move the switch fingers 40 so that they will engage the conductive paths 44 and 46, which will complete a circuit to the windshield wipers, causing them to actuate at a greater speed when desired.

From the foregoing I have disclosed a slide switch construction which incorporates both a momentary and continuing switch positions, with the components adapted to be housed in a restricted area, such as in a tubular housing, whereby the movable components will have generally axial movement through the tubular housing to complete the selective circuits associated with the switch structure.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An electrical switch having an elongated tubular dielectric housing providing an open end and a partially open top including
   a. means within the housing providing a plurality of spaced electrical conductors positioned beneath the open top and in longitudinal alignment with the open end of the housing,
   b. a first and second switch actuator movable in the same plane through the housing and into circuit-making contact with said plurality of electrical conductors,
   c. circuit-making contacts carried by said first and second actuators and movable therewith over and into contact with said plurality of electrical conductors,
   d. means provided by said first actuator in contact with said second actuator for moving said second actuator in one direction through the housing,
   e. means provided by said second actuator for moving said second actuator in either direction through the housing independently of the movement of said first actuator,
   f. and means for yieldably maintaining said second actuator in a selected position as it is moved independently by said moving means and by movement of said first actuator over and into contact with certain of said plurality of electrical conductors.

2. An electrical switch as defined by claim 1 and including means within the housing for guiding the movement of said first and second actuator in the same plane through the housing.

3. An electrical switch having a dielectric housing providing an open end and a partially open top wherein the improvement comprises
   a. means within the housing providing a plurality of spaced electrical conductors positioned beneath the open top and in longitudinal alignment with the open end of the housing,
   b. a first actuator carried by said housing and movable through the open end in the direction of said first-mentioned means, c. a switch contact member movable with said first actuator into contact with certain of said electrical conductors provided by said first-mentioned means, d. a second actuator within the housing and in contact with said first actuator and initially moved in one direction thereby into contact with certain other of said electrical conductors provided by said first-mentioned means, e. means provided by said first actuator in abutment with said second actuator so as to move said second actuator in said one direction, f. means connected to said second actuator for independently moving the same in either direction into contact with said certain electrical conductors provided by said first-mentioned means, g. and means for yieldably positioning said second actuator in a plurality of circuit-making positions in contact with said certain of said electrical conductors.

4. An electrical switch as defined by claim 3 including means provided by the housing for guiding the movement of said first and second actuators relative to each other and to said plurality of electrical conductors.

5. An electrical switch as defined by claim 3 wherein said means for yieldably positioning said second actuator in a plurality of circuit-making positions in contact with said certain of said electrical conductors, comprises a yieldable indexing member carried by said second actuator cooperating with switch-positioning means provided by said means within the housing which provides a plurality of spaced electrical conductors.

6. An electrical switch as defined by claim 3, wherein said means within the housing providing a plurality of spaced electrical conductors comprises a substantially flat-non-conductive circuit plate having mounted thereon spaced electrical terminal members and means provided by the housing for slidably receiving through its open end said circuit plate so as to position the same in longitudinal alignment with the open end and beneath the open top of the housing.

7. An electrical switch as defined by claim 3 wherein said means connected to said second actuator for independently moving the same in either direction, comprises an actuator head projecting out of the partially open top of the housing and movable parallel to the direction of movement of said first actuator for independently moving said second actuator over the plurality of spaced electrical conductors.

8. An electrical switch as defined by claim 4 wherein said means provided by the housing for guiding the movement of said first and second actuators relative to each other comprises aligned grooves provided by the interior wall of the housing, with means provided by said first and second actuators slidably received in said grooves for guiding the movement of said actuators through the housing.

* * * * *